(12) United States Patent
Iwasaki

(10) Patent No.: US 11,343,036 B2
(45) Date of Patent: May 24, 2022

(54) RADIO COMMUNICATION APPARATUS, METHOD OF PROCESSING RECEPTION SIGNAL, AND NON-TRANSITORY COMPUTER READABLE MEDIUM STORING PROGRAM

(71) Applicant: NEC CORPORATION, Tokyo (JP)

(72) Inventor: Motoya Iwasaki, Tokyo (JP)

(73) Assignee: NEC CORPORATON, Tokyo (JP)

( * ) Notice: Subject to any disclaimer, the term of this patent is extended or adjusted under 35 U.S.C. 154(b) by 0 days.

(21) Appl. No.: 16/968,760

(22) PCT Filed: Feb. 20, 2019

(86) PCT No.: PCT/JP2019/006314
§ 371 (c)(1),
(2) Date: Aug. 10, 2020

(87) PCT Pub. No.: WO2019/167754
PCT Pub. Date: Sep. 6, 2019

(65) Prior Publication Data
US 2021/0014019 A1     Jan. 14, 2021

(30) Foreign Application Priority Data
Mar. 1, 2018 (JP) .............................. JP2018-036431

(51) Int. Cl.
*H04L 5/00* (2006.01)
*H04L 27/26* (2006.01)

(52) U.S. Cl.
CPC .......... *H04L 5/0044* (2013.01); *H04L 5/0005* (2013.01); *H04L 27/2607* (2013.01)

(58) Field of Classification Search
CPC ............. H04L 27/2602; H04L 27/2634; H04L 5/0044; H04L 5/0005; H04L 27/2607
See application file for complete search history.

(56) References Cited

U.S. PATENT DOCUMENTS

| 8,351,523 B2 * | 1/2013 | Futatsugi .............. H04L 1/0054 375/260 |
| 2009/0225908 A1 * | 9/2009 | Masuda .............. H04L 27/2647 375/343 |

FOREIGN PATENT DOCUMENTS

| JP | 2009-212872 A | 9/2009 |
| JP | 2017-527212 A | 9/2017 |

(Continued)

OTHER PUBLICATIONS

International Search Report for PCT/JP2019/006314 dated Apr. 9, 2019 {PCT/ISA/210].

(Continued)

*Primary Examiner* — Sung S Ahn
(74) *Attorney, Agent, or Firm* — Sughrue Mion, PLLC

(57) ABSTRACT

A radio communication apparatus (100) according to the present disclosure includes a first frequency domain conversion unit (1) configured to convert a reception signal into a first frequency domain signal, a bandwidth restriction unit (2) configured to restrict a bandwidth by extracting a first number of points corresponding to a frequency bandwidth of a desired signal from the first frequency domain signal, a time domain conversion unit (3) configured to convert the signal with the restricted bandwidth into a time domain signal with the first number of points, a symbol reconstruction unit (4) configured to reconstruct symbols from the time domain signal, and a second frequency domain conversion unit (5) configured to convert each of the reconstructed symbols into a second frequency domain signal with the first number of points. Thus, a radio communication apparatus that can efficiently perform signal processing is provided.

6 Claims, 9 Drawing Sheets

(56) References Cited

FOREIGN PATENT DOCUMENTS

| | | |
|---|---|---|
| WO | 2012/073951 A1 | 6/2012 |
| WO | 2016/106496 A1 | 7/2016 |

OTHER PUBLICATIONS

Written Opinion for PCT/JP2019/006314 dated Apr. 9, 2019 {PCT/ISA/237].

* cited by examiner

_US 11,343,036 B2_

RADIO COMMUNICATION APPARATUS, METHOD OF PROCESSING RECEPTION SIGNAL, AND NON-TRANSITORY COMPUTER READABLE MEDIUM STORING PROGRAM

CROSS REFERENCE TO RELATED APPLICATIONS

This application is a National Stage of International Application No. PCT/JP2019/006314 filed Feb. 20, 2019, claiming priority based on Japanese Patent Application No. 2018-036431 filed Mar. 1, 2018, the entire disclosure of which is incorporated herein.

TECHNICAL FIELD

The present disclosure relates to a radio communication apparatus, a method of processing a reception signal, and a program.

BACKGROUND ART

An LTE (Long Term Evolution) system, which is the fourth generation mobile communication, and an NR (New Radio) system, which is the fifth generation mobile communication, employ a method of performing signal multiplexing a basic communication channel and a control channel by OFDM (Orthogonal Frequency Division Multiplexing).

Patent Literature 1 discloses a technique in which, in an LTE system, a base station performs Fast Fourier Transform (FFT) processing on a reception signal from a communication terminal, thereby converting the signal into a signal in a frequency domain and detecting a data pattern for each subcarrier in the frequency domain.

More specifically, Patent Literature 1 discloses a configuration including a first FFT, a BPF (Band Pass Filter), an IFFT (Inverse Fast Fourier Transform), a second FFT, and a pattern detection unit. Hereinafter, N is an integer of a power of 2. Further, m and M are integers of 2 or greater.

The first FFT converts a received input signal sequence "a" transmitted from the communication terminal from a time domain signal into a frequency domain signal b by FFT processing. In this case, the first FFT uses the FFT processing of N/m points to divide the N samples of the input signal sequence "a" by m, and performs the FFT processing m times consecutively. Then, the BPF performs BPF processing on the FFT output for each N/m points to reduce the number of points to (N/m)/M.

Each of m sets of downsampled signals must be signals continuous in a time series. Thus, in the IFFT, the Inverse Fast Fourier Transform (IFFT) processing is performed to convert a signal into a time domain signal of the downsampled N/M samples. In the second FFT, this time domain signal is again converted into a frequency domain signal by the FFT processing, and input to a pattern detection circuit to detect a pattern in the frequency domain. Then, the number of points in the IFFT can be downsampled to 1/M by the technique disclosed in Patent Literature 1.

As shown in FIG. 9, a Cyclic Prefix (CP) is added to each symbol of an uplink signal in a communication channel or a control channel in an LTE system. Thus, the FFT processing is performed in spacing in the CP part. On the other hand, in a preamble, which is an initial detection signal for random access or the like, as shown in FIG. 9, each symbol is continuously connected without inserting the CP, and a CP longer than a CP of a communication channel or a control channel is added to the head part. Hence, the timing of each symbol of the preamble signal differs from that of the communication channel and the control channel. The technique disclosed in Patent Literature 1 attempts to address this issue by separating an input signal sequence into an input signal of the communication channel and the control channel and an input signal of the preamble signal and performing the FFT processing, the BPF processing, and the IFFT processing separately on the input signals.

CITATION LIST

Patent Literature

Patent Literature 1: Japanese Unexamined Patent Application Publication No. 2009-212872

SUMMARY OF INVENTION

Technical Problem

However, in the technique disclosed in Patent Literature 1, the time domain signals that have been separately subjected to the IFFT processing are connected, and the next FFT processing is performed with a greater number of points than that in the IFFT processing. For this reason, the technique disclosed in Patent Literature 1 has a problem that signal processing cannot be efficiently performed in the FFT processing after the IFFT processing, because the amount of calculation is large.

An object of the present disclosure is to provide a radio communication apparatus, a method of processing a reception signal, and a program that can efficiently perform signal processing.

Solution to Problem

A first example aspect of the present disclosure is a radio communication apparatus including: a first frequency domain conversion unit configured to convert a reception signal into a first frequency domain signal; a bandwidth restriction unit configured to restrict a bandwidth by extracting a first number of points corresponding to a frequency bandwidth of a desired signal from the first frequency domain signal; a time domain conversion unit configured to convert the signal with the restricted bandwidth into a time domain signal with the first number of points; a symbol reconstruction unit configured to reconstruct symbols from the time domain signal; and a second frequency domain conversion unit configured to convert each of the reconstructed symbols into a second frequency domain signal with the first number of points.

A second example aspect of the present disclosure is a method of processing a reception signal including: converting the reception signal into a first frequency domain signal; restricting a bandwidth by extracting a first number of points corresponding to a frequency bandwidth of a desired signal from the first frequency domain signal; converting the signal with the restricted bandwidth into a time domain signal with the first number of points; reconstructing symbols from the time domain signal; and converting each of the restricted symbols into a second frequency domain signal with the first number of points.

A third example of the present disclosure is a program for causing a computer to execute reception signal processing including: converting a reception signal into a first frequency domain signal; restricting a bandwidth by extracting a first number of points corresponding to a frequency bandwidth of a desired signal from the first frequency domain signal; converting the signal with the restricted bandwidth into a time domain signal with the first number of points; reconstructing symbols from the time domain signal; and converting each of the restricted symbols into a second frequency domain signal with the first number of points.

Advantageous Effects of Invention

According to the present disclosure, it is possible to provide a radio communication apparatus, a method of processing a reception signal, and a program that can efficiently perform signal processing.

DESCRIPTION OF EMBODIMENTS

Hereinafter, example embodiments of the present disclosure will be described in detail with reference to the drawings. In the respective drawings, the same or corresponding elements are denoted by the same reference signs, and repeated description is omitted as necessary for clarification.

First Example Embodiment

First, a radio communication apparatus 100 according to a first example embodiment will be described. A specific example of the radio communication apparatus 100 is a base station apparatus. The radio communication apparatus 100 receives an OFDM uplink signal from a communication terminal 200.

Figure 1:
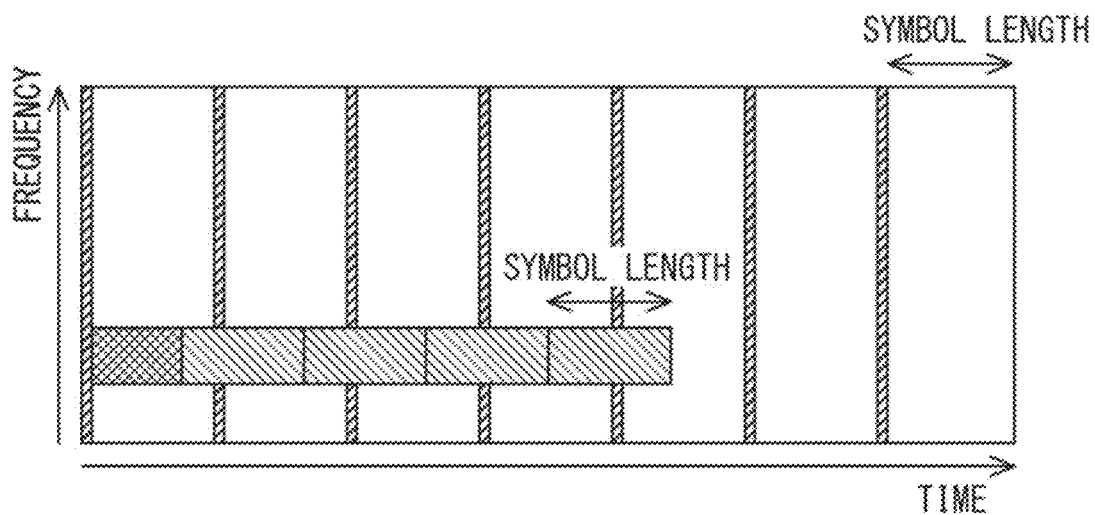
FIG. 1 shows an example of a reception signal of a radio communication apparatus according to a first example embodiment.

FIG. 1 shows an example of a reception signal from the communication terminal 200 in the radio communication apparatus 100. As shown in FIG. 1, the reception signal is assumed to have a narrow-band preamble signal multiplexed on a frequency axis between OFDM signals for a wideband communication channel. As shown in FIG. 1, the communication channel signal and the preamble signal have the same symbol lengths, but the symbols are arranged differently between the communication channel signal and the preamble signal. Thus, the timings of the symbols of the communication channel signal differs from those of the preamble signal.

The communication channel signal is composed of symbols #0 to #6. Each symbol is composed of CP and a signal part of 2048 samples. The preamble signal is composed of CP and a signal part of 24576 samples.

Figure 2:
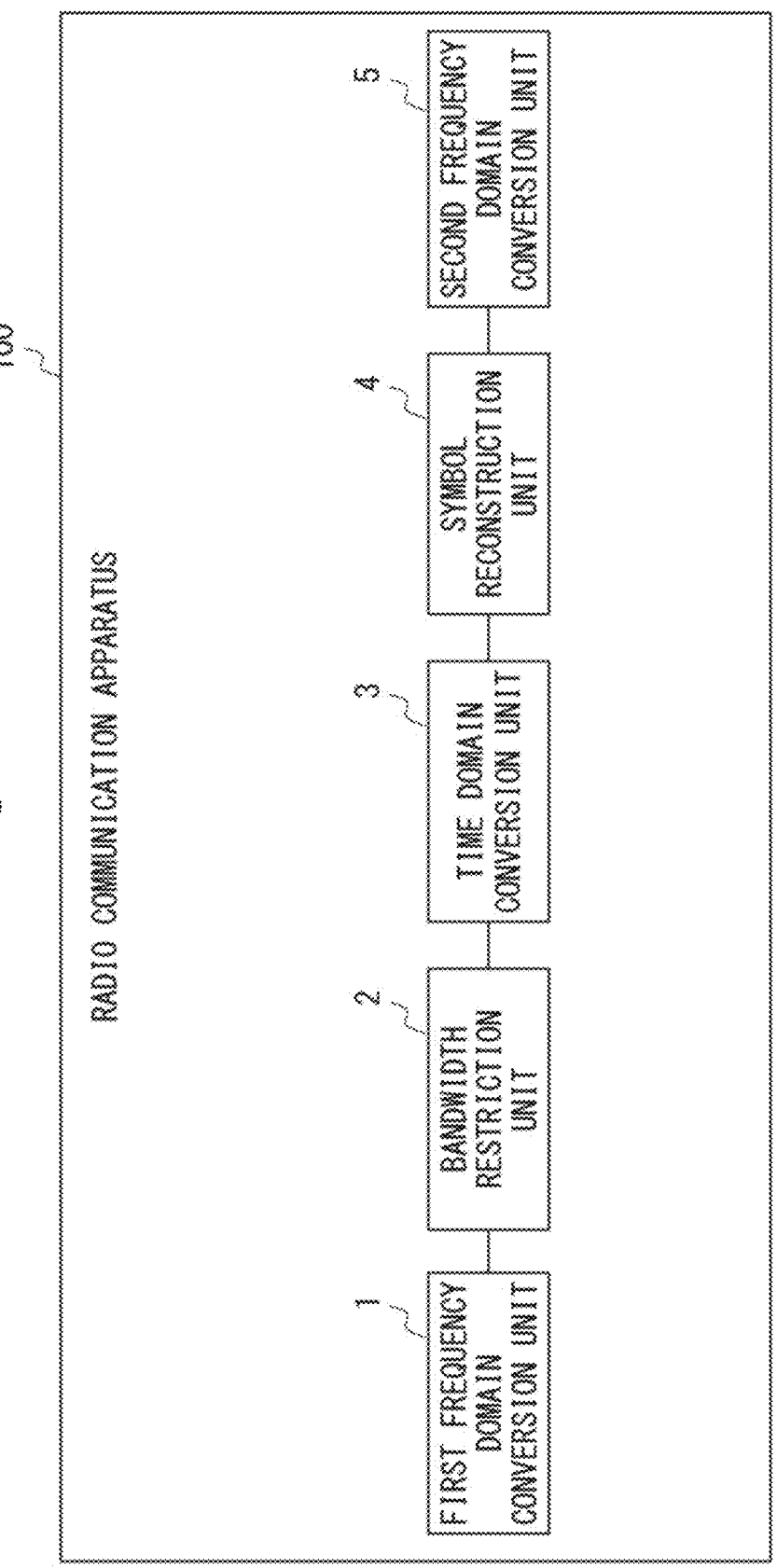
FIG. 2 is a block diagram showing an example of a configuration of the radio communication apparatus according to the first example embodiment.

Next, a configuration example of the radio communication apparatus 100 according to the first example embodiment will be described with reference to the block diagram of FIG. 2. The radio communication apparatus 100 includes a first frequency domain conversion unit 1, a bandwidth restriction unit 2, a time domain conversion unit 3, a symbol reconstruction unit 4, and a second frequency domain conversion unit 5. In the description of FIG. 2, processing of the preamble signal in FIG. 1 as a desired signal will be described as a specific example.

Figure 3:
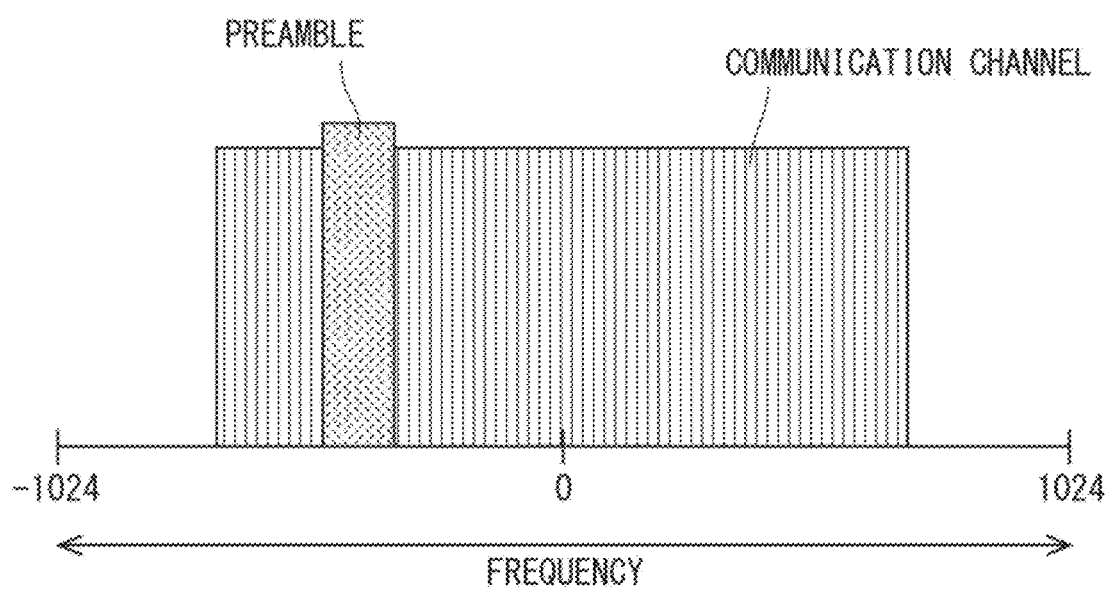
FIG. 3 shows an example of a first frequency domain signal in the radio communication apparatus according to the first example embodiment.

The first frequency domain conversion unit 1 converts a reception signal from a communication terminal into a first frequency domain signal. As a specific example, the first frequency domain conversion unit 1 performs FFT processing of 2048 points on the reception signal according to each symbol timing of the OFDM signal to thereby convert the reception signal into a first frequency domain signal. The first frequency domain conversion unit 1 performs the FFT processing of 2048 points on each signal part of 2048 samples for a communication channel signal. The first frequency domain conversion unit 1 repeats the FFT processing of 2048 points for the signal part of 24576 samples 24576/2048=12 times on a preamble signal. Thus, the first frequency domain conversion unit 1 converts the reception signal of FIG. 1 into a signal on the frequency axis as shown in FIG. 3. The first frequency domain conversion unit 1 outputs a first frequency domain signal as shown in FIG. 3 to the bandwidth restriction unit 2.

Figure 4:
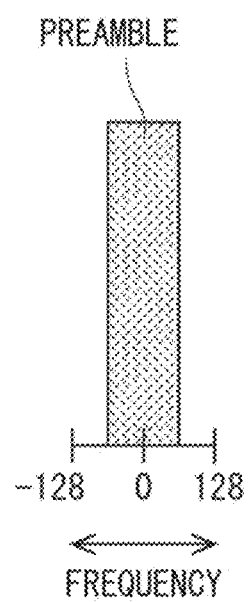
FIG. 4 shows an example of a signal with a bandwidth restricted by a bandwidth restriction unit in the radio communication apparatus according to the first example embodiment.

The bandwidth restriction unit 2 extracts a first number of points corresponding to a frequency bandwidth of a desired signal from the first frequency domain signal. As a specific example, the bandwidth restriction unit 2 extracts 256 points including a desired preamble signal out of the signal of 2048 points subjected to the FFT processing, and restricts the bandwidth so that a part of the preamble other than the frequency bandwidth becomes zero. FIG. 4 shows an example of a signal with a bandwidth restricted by the bandwidth restriction unit 2. The bandwidth restriction unit 2 outputs the bandwidth-restricted signal to the time domain conversion unit 3.

The position of the preamble on the frequency axis is determined by the system. The position of the preamble on the frequency axis may vary, but how the position of the preamble varies on the frequency axis is predetermined. Thus, the bandwidth restriction unit 2 can know the position of the preamble on the frequency axis and extract the preamble signal.

Figure 5:
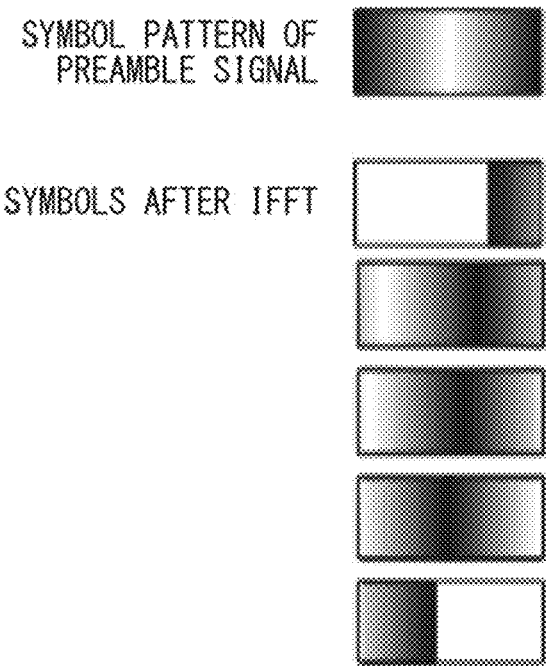
FIG. 5 shows an example of a time domain signal converted by a time domain conversion unit in the radio communication apparatus according to the first example embodiment.

The time domain conversion unit 3 converts the bandwidth-restricted signal into a time domain signal with a first number of points. As a specific example, the time domain conversion unit 3 converts a preamble signal into a time domain signal by performing 256-point IFFT processing on the bandwidth-restricted signal, namely, the preamble signal. FIG. 5 shows an example of the time domain signal converted by the time domain conversion unit 3. As shown in FIG. 5, each symbol after the IFFT processing becomes a signal sampled at a timing different from a symbol pattern of the preamble signal. Then, the time domain conversion unit 3 outputs the time domain signal to the symbol reconstruction unit 4.

The symbol reconstruction unit 4 reconstructs the symbol from the time domain signal. Then, the symbol reconstruction unit 4 outputs each reconstructed symbol to the second frequency domain conversion unit 5.

The second frequency domain conversion unit 5 converts each reconstructed symbol into a second frequency domain signal with a first number of points. As a specific example, the second frequency domain conversion unit 5 performs the FFT processing of 256 points on each reconstructed symbol to obtain a second frequency domain signal in accordance with the symbol timing of the preamble signal.

Figure 6:
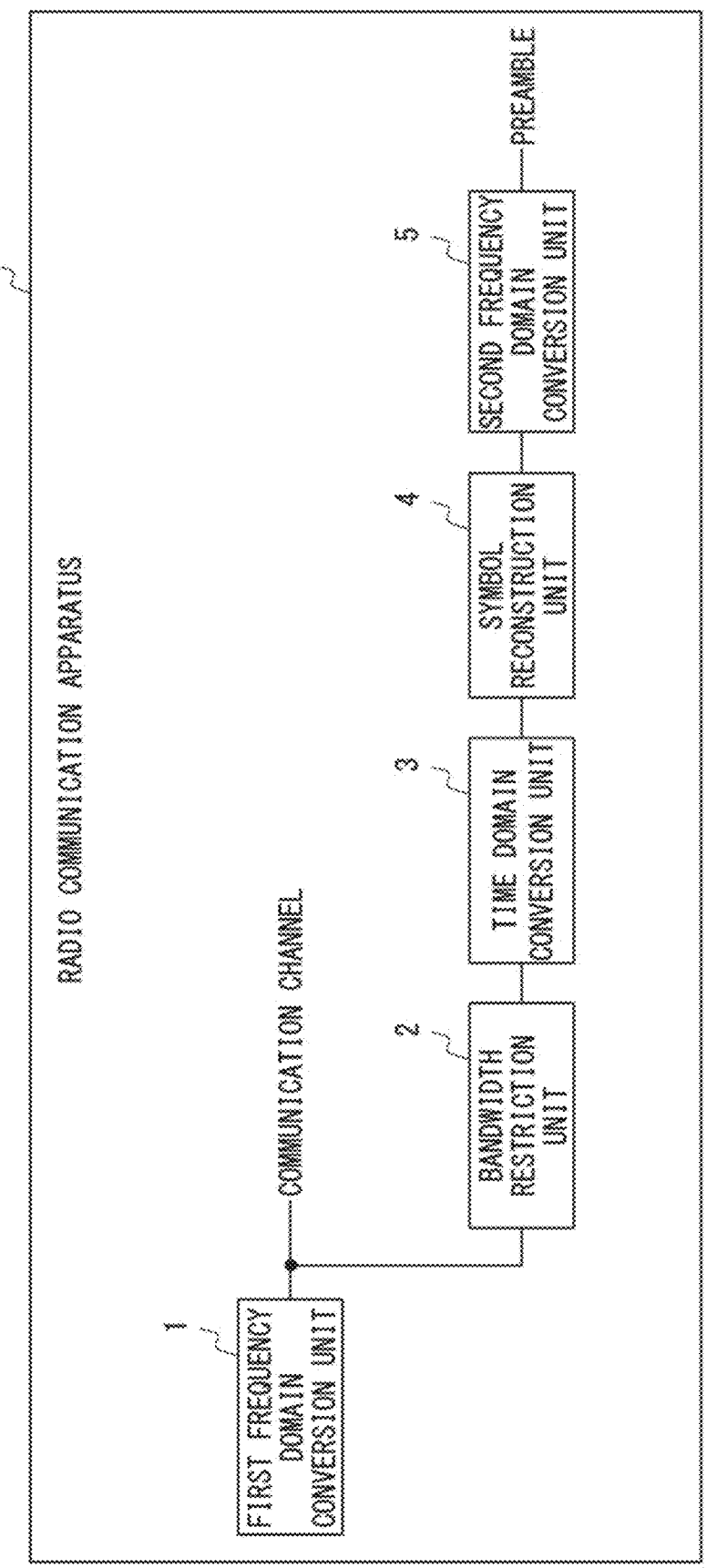
FIG. 6 is a block diagram showing another example of the configuration of the radio communication apparatus according to the first example embodiment.

The radio communication apparatus 100 may be configured as shown in, for example, FIG. 6. In the example of FIG. 6, an output of the first frequency domain conversion unit 1 is branched. With this configuration, for example, the first frequency domain conversion unit 1 can be shared by a communication channel signal and a preamble signal for access, and the communication channel signal and the preamble signal can be branched from each other in the output of the first frequency domain conversion unit 1. The preamble signal can be processed by a path including the bandwidth restriction unit 2, the time domain conversion unit 3, the symbol reconstruction unit 4, and the second frequency domain conversion unit 5. The communication channel signal can be processed by the other path. That is, the radio communication apparatus 100 can efficiently perform signal processing on a plurality of signals having the same symbol length and different reception timings and frequency bandwidths.

Figure 7:
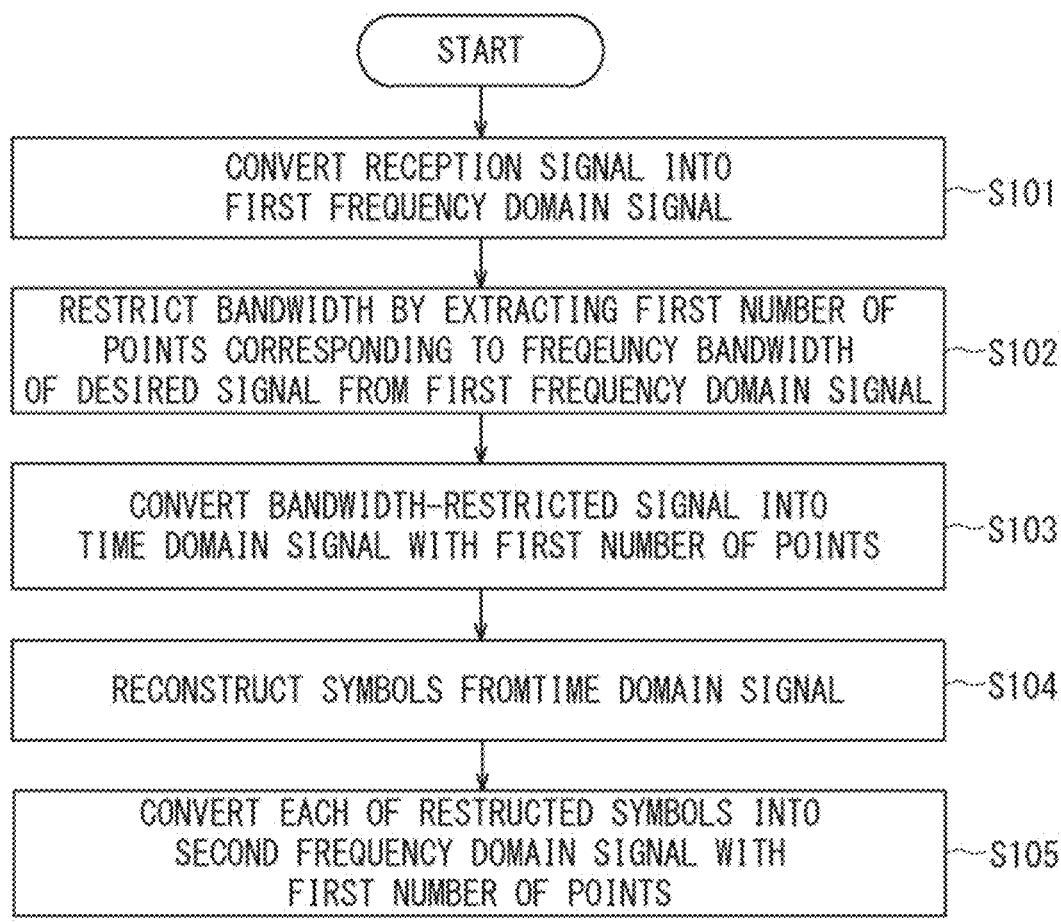
FIG. 7 is a flowchart showing an operation example of the radio communication apparatus according to the first example embodiment.

Next, an operation example of the radio communication apparatus 100 according to the first example embodiment will be described with reference to the flowchart of FIG. 7.

First, the radio communication apparatus 100 converts a reception signal into a first frequency domain signal by the first frequency domain conversion unit 1 (Step S101).

Next, the radio communication apparatus 100 restricts the bandwidth by extracting the first number of points corresponding to the frequency bandwidth of a desired signal from the first frequency domain signal by the bandwidth restriction unit 2 (Step S102).

Next, the radio communication apparatus 100 converts the bandwidth-restricted signal into a time domain signal with the first number of points by the time domain conversion unit 3 (Step S103).

Next, the radio communication apparatus 100 reconstructs symbols from the time domain signal by the symbol reconstruction unit 4 (Step S104).

Next, the radio communication apparatus 100 converts each symbol reconstructed by the second frequency domain conversion unit 5 into a second frequency domain signal with the first number of points (Step S105).

As described above, the radio communication apparatus 100 according to the first example embodiment is configured to perform the conversion processing for converting into a second frequency domain signal by the second frequency domain conversion unit 5 with the same number of points as that in the conversion processing for converting into a time domain signal by the time domain conversion unit 3. That is, in the radio communication apparatus 100, the number of points in the conversion processing for converting into the second frequency domain signal does not become greater than the number of points in the conversion processing for converting into a time domain signal performed by the time domain conversion unit 3. Thus, the radio communication apparatus 100 can reduce the amount of calculation by the second frequency domain conversion unit 5. That is, the radio communication apparatus 100 can efficiently perform signal processing.

Second Example Embodiment

Next, a radio communication apparatus 100A according to the second example embodiment will be described. The second example embodiment relates to a specific example of reconstructing symbols from a time domain signal. The radio communication apparatus 100A includes a first frequency domain conversion unit 1, a bandwidth restriction unit 2, a time domain conversion unit 3, a symbol reconstruction unit 4A, and a second frequency domain conversion unit 5. A configuration of the radio communication apparatus 100A is the same as that of the radio communication apparatus 100 shown in FIG. 2 or 6, and is not shown.

The symbol reconstruction unit 4A receives a time domain signal from the time domain conversion unit 3. The symbol reconstruction unit 4A reconstructs a desired signal by rearranging each symbol of the received time domain signal, and then reconstructs the symbol by dividing the reconstructed desired signal again. The symbol reconstruction unit 4A outputs the reconstructed symbol to the second frequency domain conversion unit 5.

Figure 8:
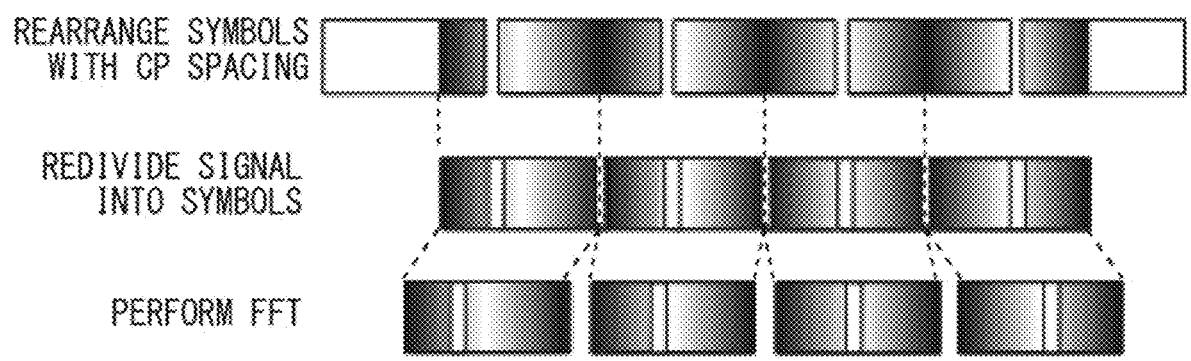
FIG. 8 is a diagram for explaining a specific example of symbol reconstruction performed by a symbol reconstruction unit of the radio communication apparatus according to a second example embodiment.
Figure 9:
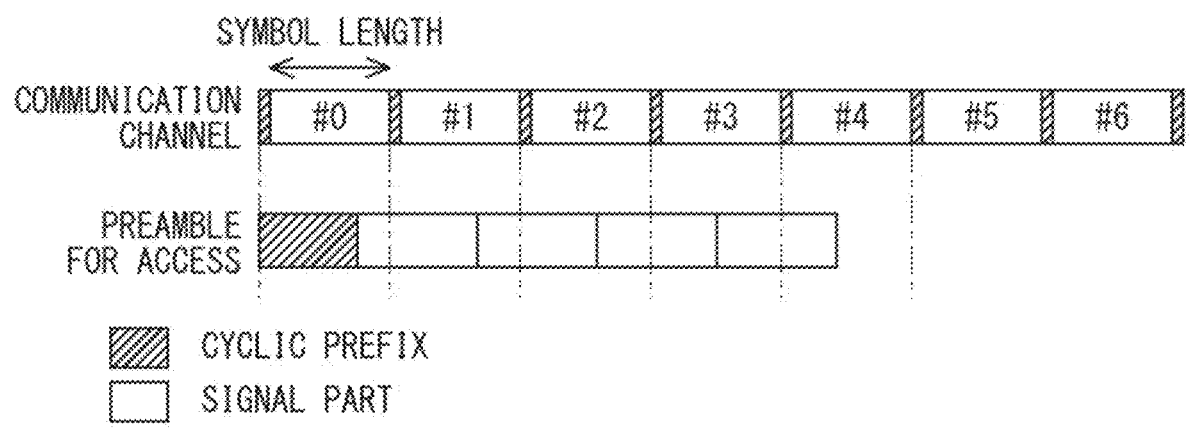
FIG. 9 is a configuration diagram of an uplink signal in an LTE system.

Next, a specific example of the symbol reconstruction by the symbol reconstruction unit 4A will be described with reference to FIG. 8. In the description of FIG. 8, it is assumed that the time domain conversion unit 3 performs the IFFT processing, and the second frequency domain conversion unit 5 performs the FFT processing.

First, the symbol reconstruction unit 4A receives each symbol that has been subjected to the IFFT processing shown in FIG. 5 from the time domain conversion unit 3. Next, the symbol reconstruction unit 4A reconstructs a desired signal by arranging the symbols which have been subjected to the IFFT processing with spacing corresponding to CPs inserted between the symbols. As a specific example, the symbol reconstruction unit 4A reconstructs a preamble signal as shown in the upper part of FIG. 8 by arranging the symbols which have been subjected to the IFFT processing with spacing corresponding to CPs inserted between the symbols.

Next, the symbol reconstruction unit 4A reconstructs the symbol by extracting the first number of points of the desired signal each time from the reconstructed desired signal according to the symbol timing of the desired signal. As a specific example, the symbol reconstruction unit 4A reconstructs symbols by extracting 256 points each time from the reconstructed preamble signal shown in the upper part of FIG. 8 in accordance with the symbol timing of the preamble signal. Then, the symbols shown in the middle of FIG. 8 is reconstructed. The symbol reconstruction unit 4A outputs the reconstructed symbol to the second frequency domain conversion unit 5.

The second frequency domain conversion unit 5 obtains a signal on the frequency axis in accordance with the symbol timing of the preamble signal by performing the FFT processing of 256 points for each reconstructed symbol.

As described above, the radio communication apparatus 100A according to the second example embodiment is configured to reconstruct a desired signal by arranging the symbols of the time domain signal with spacing corresponding to CPs inserted between the symbols by the symbol reconstruction unit 4A. Thus, the radio communication apparatus 100A can generate a desired signal including spacing corresponding to CPs.

Further, the radio communication apparatus 100A is configured to reconstruct symbols by extracting a first number of points each time from the reconstructed desired signal in accordance with the symbol timing of the desired signal by the symbol reconstruction unit 4A. Thus, in the radio communication apparatus 100 A, the second frequency domain conversion unit 5 can process signals divided into the first number of points. By doing so, in the radio communication apparatus 100 A, the load in the second frequency domain conversion unit 5 can be reduced.

In the above example embodiments, an example in which the FFT processing is used as the frequency domain conversion and the IFFT processing is used as the time domain conversion has been described. However, the present disclosure is not limited to this. For example, Discrete Fourier Transform (DFT) processing may be used as the frequency domain transform, and Inverse Discrete Fourier Transform (IDFT) processing may be used as the time domain transform.

In the example embodiments described above, an example in which the reception signal is an OFDM signal has been described. However, the present disclosure is not limited to this. The reception signal may be any signal separated for each symbol, and may be, for example, a single carrier such as DFT-S-OFDM (DFT spread OFDM).

In the above example embodiments, the present disclosure has been described as a hardware configuration, but the present disclosure is not limited to this. The present disclosure can also be realized by causing a computer such as a CPU (Central Processing Unit) provided in a radio communication apparatus to execute a program for performing each processing of each of the above-described functional units.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-RW, DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the example embodiments, the present disclosure is not limited by the above-described example embodiments. The configuration and details of the present disclosure may be modified in various ways as will be understood by those skilled in the art within the scope of the invention.

This application is based upon and claims the benefit of priority from Japanese patent application No. 2018-036431, filed on Mar. 1, 2018, the disclosure of which is incorporated herein in its entirety by reference.

REFERENCE SIGNS LIST

1 FIRST FREQUENCY DOMAIN CONVERSION UNIT
2 BANDWIDTH RESTRICTION UNIT
3 TIME DOMAIN CONVERSION UNIT
4, 4A SYMBOL RECONSTRUCTION UNIT
5 SECOND FREQUENCY DOMAIN CONVERSION UNIT
100, 100A RADIO COMMUNICATION APPARATUS

The invention claimed is:

1. A radio communication apparatus comprising:
hardware, including a processor and a memory;
first frequency domain conversion unit that is implemented at least by the hardware and that coverts a reception signal into a first frequency domain signal;
bandwidth restriction unit that is implemented at least by the hardware and that restricts a bandwidth by extracting a first number of points corresponding to a frequency bandwidth of a desired signal from the first frequency domain signal;
time domain conversion unit that is implemented at least by the hardware and that converts the signal with the restricted bandwidth into a time domain signal with the first number of points;
symbol reconstruction unit that is implemented at least by the hardware and that reconstructs symbols from the time domain signal; and
second frequency domain conversion unit that is implemented at least by the hardware and that converts each of the reconstructed symbols into a second frequency domain signal with the first number of points,
wherein
the symbol reconstruction unit reconstructs the desired signal by rearranging each of the symbols of the time domain signal and divides the reconstructed desired signal again to thereby reconstruct the symbols.

2. The radio communication apparatus according to claim 1, wherein
the symbol reconstruction unit reconstructs the desired signal by arranging the symbols of the time domain signal with spacing corresponding to cyclic prefixes inserted between the symbols.

3. The radio communication apparatus according to claim 1, wherein
the symbol reconstruction unit reconstructs the symbols by extracting the first number of points each time from the reconstructed desired signal in accordance with a symbol timing of the desired signal.

4. A radio communication apparatus comprising:
hardware, including a processor and a memory;
first frequency domain conversion unit that is implemented at least by the hardware and that coverts a reception signal into a first frequency domain signal;
bandwidth restriction unit that is implemented at least by the hardware and that restricts a bandwidth by extracting a first number of points corresponding to a frequency bandwidth of a desired signal from the first frequency domain signal;
time domain conversion unit that is implemented at least by the hardware and that converts the signal with the restricted bandwidth into a time domain signal with the first number of points;

symbol reconstruction unit that is implemented at least by the hardware and that reconstructs symbols from the time domain signal; and second frequency domain conversion unit that is implemented at least by the hardware and that converts each of the reconstructed symbols into a second frequency domain signal with the first number of points, wherein the reception signal includes a communication channel signal and a preamble signal, the first frequency domain conversion unit processes the communication channel signal and the preamble signal, and the bandwidth restriction unit, the time domain conversion unit means, the symbol reconstruction unit, and the second frequency domain conversion unit means process the preamble signal.

5. A method of processing a reception signal comprising:

converting the reception signal into a first frequency domain signal;

restricting a bandwidth by extracting a first number of points corresponding to a frequency bandwidth of a desired signal from the first frequency domain signal;

converting the signal with the restricted bandwidth into a time domain signal with the first number of points;

reconstructing the desired signal by rearranging symbols of the time domain signal and dividing the reconstructed desired signal again to thereby reconstruct symbols; and converting each of the reconstructed symbols into a second frequency domain signal with the first number of points.

6. A non-transitory computer readable medium storing a program for causing a computer to execute reception signal processing comprising:

converting a reception signal into a first frequency domain signal;

restricting a bandwidth by extracting a first number of points corresponding to a frequency bandwidth of a desired signal from the first frequency domain signal;

converting the signal with the restricted bandwidth into a time domain signal with the first number of points;

reconstructing the desired signal by rearranging each of the symbols of the time domain signal and dividing the reconstructed desired signal again to thereby reconstruct symbols; and converting each of the reconstructed symbols into a second frequency domain signal with the first number of points.

* * * * *